United States Patent [19]
Wiklund

[11] 4,000,652
[45] Jan. 4, 1977

[54] METHOD AND DEVICE FOR MEASURING THE CORRECTION FACTOR

[75] Inventor: Klas Rudolf Wiklund, Taby, Sweden

[73] Assignee: AGA Aktiebolag, Lidingo, Sweden

[22] Filed: May 4, 1973

[21] Appl. No.: 357,492

[30] Foreign Application Priority Data

May 10, 1972  Sweden .............................. 6173/72

[52] U.S. Cl. .................................... 73/336; 73/30; 73/386; 73/410
[51] Int. Cl.² ......................................... G01N 9/26
[58] Field of Search ............ 73/336, 409, 410, 384, 73/387, 386, 398, 30

[56] References Cited
UNITED STATES PATENTS

| | | | |
|---|---|---|---|
| 1,866,660 | 7/1932 | Luckey | 73/386 |
| 2,442,938 | 6/1948 | Ruge | 73/398 AR |
| 3,496,775 | 2/1970 | Sargent | 73/384 |

OTHER PUBLICATIONS

"Physics;" Hausmann et al, copyright 1935 pp. 649, 650.

*Primary Examiner*—S. Clement Swisher
*Assistant Examiner*—Denis E. Corr
*Attorney, Agent, or Firm*—Lerner, David, Littenberg & Samuel

[57] ABSTRACT

Two embodiments of a device and method are disclosed for providing a correction factor for the velocity of electromagnetic radiation in air. The devices include a pressure-responsive vessel having a predetermined quantity of gas enclosed therein and means for sensing the size of the enclosed volume to provide a measurement of the correction factor. Means are also disclosed for employing a humidity responsive device for moving a scale so that the correction factor is also made responsive to the humidity.

2 Claims, 2 Drawing Figures

METHOD AND DEVICE FOR MEASURING THE CORRECTION FACTOR

FIELD OF THE INVENTION

The present invention relates to a method and a device for measuring the correction factor for the electromagnetic wave velocity in air.

BACKGROUND OF THE INVENTION

When distances are measured by means of electromagnetic waves, it is of the greatest importance, if high accuracy is to be achieved, that the measuring instrument is corrected for the electromagnetic wave velocity in air, since this velocity varies with the air pressure and temperature. The velocity also varies with the humidity of the air, although the effect of this is relatively small. To obtain this correction factor until now the temperature of the air has been measured by means of a thermometer and its pressure by means of a barometer. Subsequently the correction factor has been obtained by calculation work from these data. In certain cases also a so-called nomogram has been available, where it has been possible by entering the known values of temperature and pressure into the scales directly to read off the correction factor.

The present invention relates to a method and a device which allows the direct reading of the correction factor on a scale, without first using a thermometer or barometer and subsequently carrying out the calculation work mentioned above or go into a tabular compilation. In accordance with a further development of the invention it is not even necessary to read a scale, but the device in accordance with the invention can directly correct the measuring instrument, in which the correction factor is to be applied.

The measuring instrument which is used for measuring the distance and which used modulated light is so accurate that it requires an estimation of the temperature which is better than 1° C and of the pressure which is better than 3 mm Hg. These variables each give a correction of approx. $10^{-6}$ at 760 mm Hg and 20° C. The humidity makes a contribution to its error which is usually less than $10^{-6}$, which can thus normally be neglected.

It is a known fact that the abovementioned correction factor is proportional to the air pressure and inversely proportional to the absolute temperature of the air. From the general gas law it is known that the inverted value of a volume of a quantity of air is proportional to its pressure and inversely proportional to its absolute temperature. The method and device in accordance with the present invention make use of these relations.

BRIEF DESCRIPTION OF THE INVENTION

In order to overcome the disadvantages of the prior art, the present invention provides a method and device for measuring a correction factor for the velocity of electromagnetic radiation in air. The device includes a pressure-responsive vessel having a gas-type chamber therein and an outer surface for providing an enclosed volume in the gas-type chamber. The size of the chamber changes in response to the pressure of gas in the gas-type chamber and on the outer surface. A predetermined quantity of gas is sealed into the gas-type chamber. The pressure-responsive vessel includes thermal conductive means for varying the temperature of the predetermined quantity of gas in response to the temperature of the outer surface and means for sensing the size of the enclosed volume is also provided to result in a measurement of the correction factor.

In a preferred embodiment a scale is mounted adjacent to the pressure-responsive vessel for a direct reading of the correction factor. A humidity responsive device is connected to the scale to also provide a humidity correction in the measurement.

DESCRIPTION OF THE DRAWINGS

The invention will be explained in detail with the help of the enclosed drawing, in which.

DETAILED DESCRIPTION OF THE INVENTION

Figure 1:
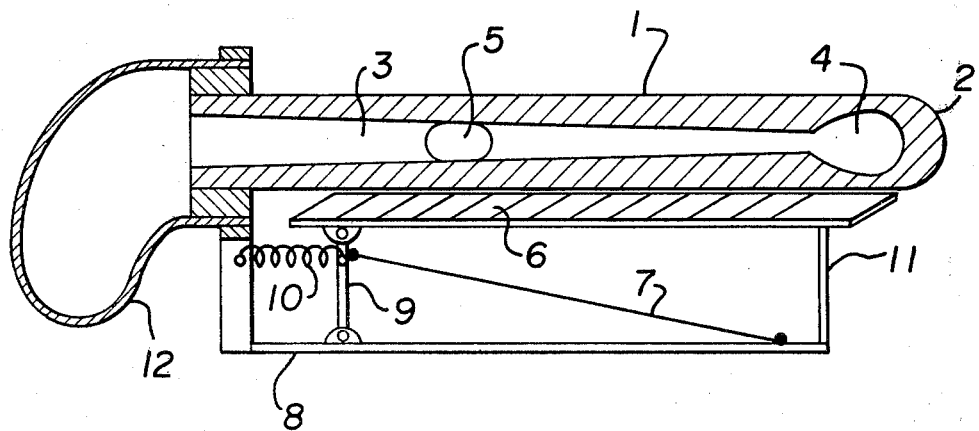
FIG. 1 is a sectional view showing an embodiment of a device in accordance with the invention.

In FIG. 1 numeral 1 designates a hollow glass tube which is sealed at one end 2. A hollow 3 in the glass tube 1 is formed so that it has its largest area at the open end of the glass tube, whilst the hollow tapers off towards the end 2. Close to the end 2 of the glass tube 1 the hollow 3 widens however and forms a cavity 4. A drop 5 of, for example, mercury enclosed a certain amount of gas, consisting for example of nitrogen, in the cavity 4 and that part of the hollow 3 which is situated between the drop 5 and the cavity 4.

The glass tube is maintained in the air for which the correction factor for the electromagnetic wave velocity is to be determined. In doing this the nitrogen gas in the glass tube is subjected to the pressure and temperature of the surrounding air, the drop of mercury only constituting a movable partition wall for the nitrogen gas. The position of the mercury drop 5 in the glass tube will vary as a function of the pressure and temperature of the surrounding air. In the knowledge that the correction factor for the electromagnetic wave velocity in air is a function of this pressure and this temperature, the position of the mercury drop can give a direct measure of the correction factor wanted.

By placing a scale 6 along the glass tube the position of the mercury drop can be read off and consequently it is possible to calibrate the scale directly in the correction factor wanted. By virtue of the hollowness 3 of the glass tube being made to taper from the opening, the scale 6 can be made linear if the tapering of the hollowness is suitably dimensioned. The method and the device in accordance with the invention function equally well, however, if the hollow has the same area over the whole way, whereby however the scale becomes non-linear.

The general gas law lays down that $1/V = k_1 \cdot P/T$, where V is the volume of the enclosed quantity of gas, P is the pressure of the surrounding air and T its absolute temperature. $k_1$ is a constant. It is known that the correction factor wanted is proportional to P/T, which means that this correction factor is also proportional to 1/V. What is measured in accordance with the method and device in accordance with the invention is the volume of the quantity of gas shut in and it is evident from what has been said earlier, that this volume does not vary linearly with the correction factor, but by forming the hollowness of the glass tube as has been indicated above at least approximate linearity can be obtained.

In certain extremely accurate measurements it may be necessary to correct the factor wanted in respect of the humidity of the air. This may be done so, for example, that the scale 6 is adapted to be displaced under the influence of an element sensitive to moisture. This element which is sensitive to moisture may consist for example of a hair 7, which is fixed with its one end in a stand 8 firmly connected to the glass tube 1. The other end of the moisture-sensitive element 7 may be fixed in a support 9, which is hinged and is arranged between the stand 8 and the scale 6. The scale 6 rests loosely on the upper end of the support 11, so that the scale may glide on the support 11. Some moisture-sensitive elements (for example hairs) are subject to a non-linear change in length as a function of moisture. With the help of a non-linear spring 6, nevertheless a linear displacement of the scale 6 can be achieved.

To protect the drop of mercury from oxidation by the surrounding atmosphere the open end of the glass tube may be provided with a soft diaphragm 12 of for example rubber. This diaphragm 12 and the hollowness of the tube between the drop of mercury 5 and the mouth is filled with a gas which exerts no oxidizing action upon the drop 5, for example nitrogen.

Figure 2:
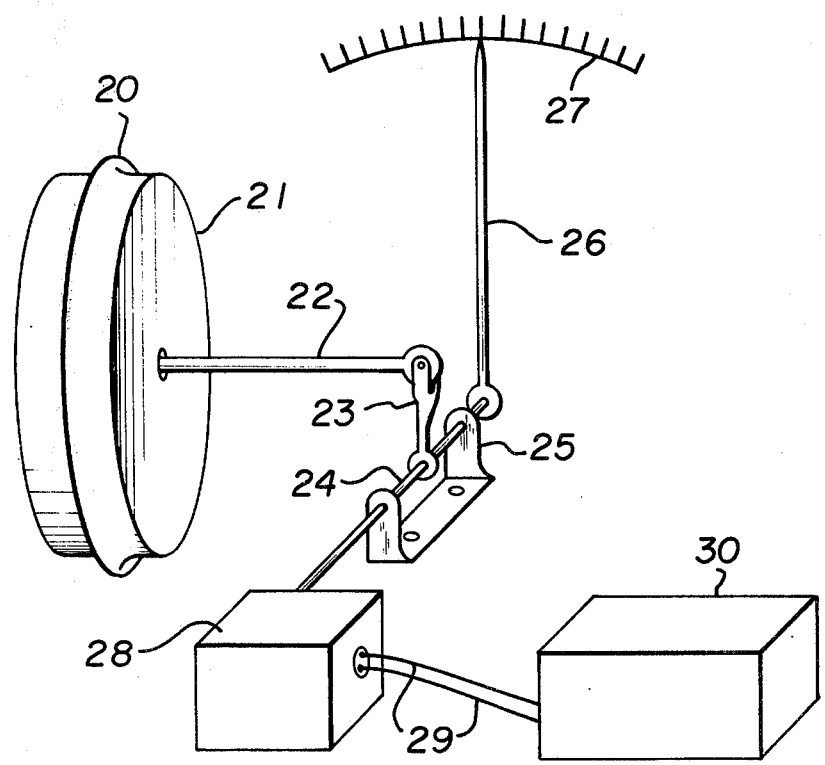
FIG. 2 is an Isometric view showing a further embodiment of the invention.

FIG. 2 shows a second embodiment of the device in accordance with the invention. Numeral 20 designates a box of sheet metal of the type which is found in aneroid barometers. This box 20 has a wall 21 which is thin and preferably pleated, as indicated in the figure. Joined to this wall 21 is the one end of a rod 22 so that it projects from the wall. To the other end of the rod 22 a link 23 is connected, pivotably, with its one end. Moreover, this link 23 with its other end is fixed to an axle 24 which is supported rotatably in a support 25. Firmly fixed to the one end of the axle 24 is a pointer 26, the deflection of which pointer can be read on a scale 27.

In contrast to what happens in an aneroid barometer, the box 20 is filled with a certain quantity of gas. In analogy with what happens in the device in accordance with FIG. 1, this gas is subjected to the pressure and the temperature of the surrounding atmosphere, in that the wall 21 readily transmits the pressure of the outside atmosphere to the gas shut in. As the wall 21 moves, the rod 22 will, via the link 23, cause the axle 24 to turn, as a result of which the pointer 26 performs a certain deflection which can be read off the scale 27. The scale 27 can indicate directly the correction factor wanted. The deflection of the pointer 26, according to what has been said previously, will be non-linear, using the device described here. It is also possible, however, to give the wall such a shape that, depending on the curving of the wall, the deflection of the pointer can become linear.

The device in accordance with FIG. 2, in addition to what is shown in the figure, may also be constructed so that the movement of the wall 21 is transmitted by means of a rack to a gear wheel which is fixed to an axle. Here too a linear deflection of the pointer can be achieved if the gear wheel or the rack are adapted to have varying distances between the teeth.

The device in accordance with FIG. 2, as described until now, does not provide for any moisture correction for the correction factor wanted. It is possible, however, by means of devices similar to that which has been described in connection with FIG. 1, to correct the scale 27 in respect of moisture.

In accordance with the concept of the invention the correction factor can also be picked up electrically. This can be done naturally in many different ways and in FIG. 2 only one of the possible forms of realization has been indicated. This consists in that the turning of the axle 24 is transmitted to an electric circuit 28 so that on the output 29 of this circuit electric signals are generated which are a function of the picked up value for the correction factor. The electric circuit 28 may include for example a rotary potentiometer, variable capacitor, or a variable oscillator which is mechanically adjustable by means of the axle 24. The signals produced on the output of the circuit 28 can be passed to an instrument 30 which may consist, for example, of a recorder, a numerical indicator or it may be directly, for example, a distance measuring instrument, which can thus be corrected by electric means automatically by this method in respect of variations in the light velocity in air.

Naturally it is also possible to provide the device in FIG. 1 with electric pick-up of the correction factor. This may be realized by means of optical detector elements known per se.

The drop 5 in FIG. 1 may furthermore be divided into two parts of equal size with a small distance from one another. By means of this it can easily be observed if anyone of these small drops of equal size divides up, even if the separated part disappears from the range of vision, since the two small drops will become unequal in size. If such a division is not discovered, the fault in the reading will become appreciable.

With two small drops the reading becomes simpler and more exact, since the interspace between the drops can be utilized for very accurate reading.

If the device in accordance with the invention is subjected to changes in pressure, for example during air transport, there is a risk that the drop of mercury might leave the tube. This can be prevented if the tube is so designed that it has a constriction in one or in both ends.

To prevent the mercury drop from leaving the tube in case of acceleration, one or both ends may be pivoted with a sharp bend or the tube may be given a spiral shape. If the tube is provided with both, constriction and bend, the drop of mercury will be effectively prevented from leaving the tube.

What is claimed is:

1. A device for measuring a correction factor for the velocity of electromagnetic radiation in air; said device including:
   a pressure responsive vessel having a gas-tight chamber therein and an outer surface for providing an enclosed volume in said gas-type chamber whose size changes in response to the pressure of gas in said gas-tight chamber and on said outer surface;
   a predetermined quantity of gas sealed into said gas-tight chamber; said pressure responsive vessel including thermal conductor means for varying the temperature of said predetermined quantity of gas in response to the temperature of said outer surface;
   means for sensing the size of said enclosed volume to provide a measurement of said correction factor;
   the device being characterized in that said pressure-responsive vessel includes a tube having a hollow therein, sealed at one end, and said predetermined volume of gas is shut in said hollow by a liquid drop arranged in said hollow;

the hollow has a conical shape, so that the cross-section of the hollow increases with increasing volume, as a result of which the change in position of the liquid drop becomes a linear measure of the factor wanted; and a scale, mounted adjacent to said tube, for direct reading of said device based upon the position of said liquid drop.

2. A device for measuring a correction factor for the velocity of electromagnetic radiation in air; said device including:

a pressure responsive vessel having a gas tight chamber therein and an outer surface for providing an enclosed volume in said gas type chamber whose size changes in response to the pressure of gas in said gas tight chamber and on said outer surface;

a predetermined quantity of gas sealed into said gas tight chamber; said pressure responsive vessel including thermal conductor means for varying the temperature of said predetermined quantity of gas in response to the temperature of said outer surface;

means for sensing the size of said enclosed volume to provide a measurement of said correction said pressure responsive vessel includes a tube having a hollow therein, sealed at one end, and said predetermined volume of gas is shut in said hollow by a liquid drop arranged in said hollow;

a scale, mounted adjacent to said tube for direct reading of said position of said liquid drop;

a moisture-sensitive element adapted to displace the scale so that the direct reading of the scale gives the correction for humidity of the said factor.

* * * * *